United States Patent [19]
Nakajima et al.

[11] Patent Number: 5,774,165
[45] Date of Patent: Jun. 30, 1998

[54] LIGHT EMISSION INTENSITY WIDTH COMPENSATING METHOD OF LED PRINT HEAD AND APPARATUS THEREOF

[75] Inventors: Norio Nakajima; Hisashi Tsukagoshi; Katsuya Kamimura; Yoshihisa Aikoh, all of Tokyo, Japan

[73] Assignee: Oki Electric Industry Co., Ltd., Tokyo, Japan

[21] Appl. No.: 517,491

[22] Filed: Aug. 21, 1995

[30] Foreign Application Priority Data

Sep. 22, 1994 [JP] Japan .................................... 6-227739

[51] Int. Cl.⁶ ........................................................ B41J 2/47
[52] U.S. Cl. ............................................ 347/236; 347/246
[58] Field of Search .................................... 347/236, 246, 347/247, 237

[56] References Cited

U.S. PATENT DOCUMENTS

| | | | |
|---|---|---|---|
| 4,857,944 | 8/1989 | Hart et al. | 347/236 |
| 5,140,157 | 8/1992 | Ohshima et al. | 347/236 |
| 5,586,055 | 12/1996 | Ng et al. | 347/236 |

*Primary Examiner*—Mark J. Reinhart
*Attorney, Agent, or Firm*—Panitch Schwarze Jacobs & Nadel, P.C.

[57] ABSTRACT

The present invention is a light emission intensity width compensating method of an optical print head having a large number of light emitting devices, comprising the steps of measuring a light emission intensity distribution of each of the light emitting devices of the optical print head, slicing the distribution corresponding to a reference light emission intensity value, calculating a light emission intensity width of the reference light emission intensity value for each of the light emitting devices, designating a compensation value of drive energy so that each of the light emission intensity widths becomes equal, and causing each light emitting device to emit light corresponding to the compensation value of the drive energy. In addition, the present invention is an apparatus corresponding to the light emission intensity compensating method. The compensation values of the drive energy are stored in a storing means of the apparatus. When data is printed, the light emitting devices of the optical print head are lit corresponding to the compensation value of the drive energy. Thus, the drive energy is varied corresponding to the light emission intensity width. Consequently, a dot image can be printed free of uneven density.

17 Claims, 7 Drawing Sheets

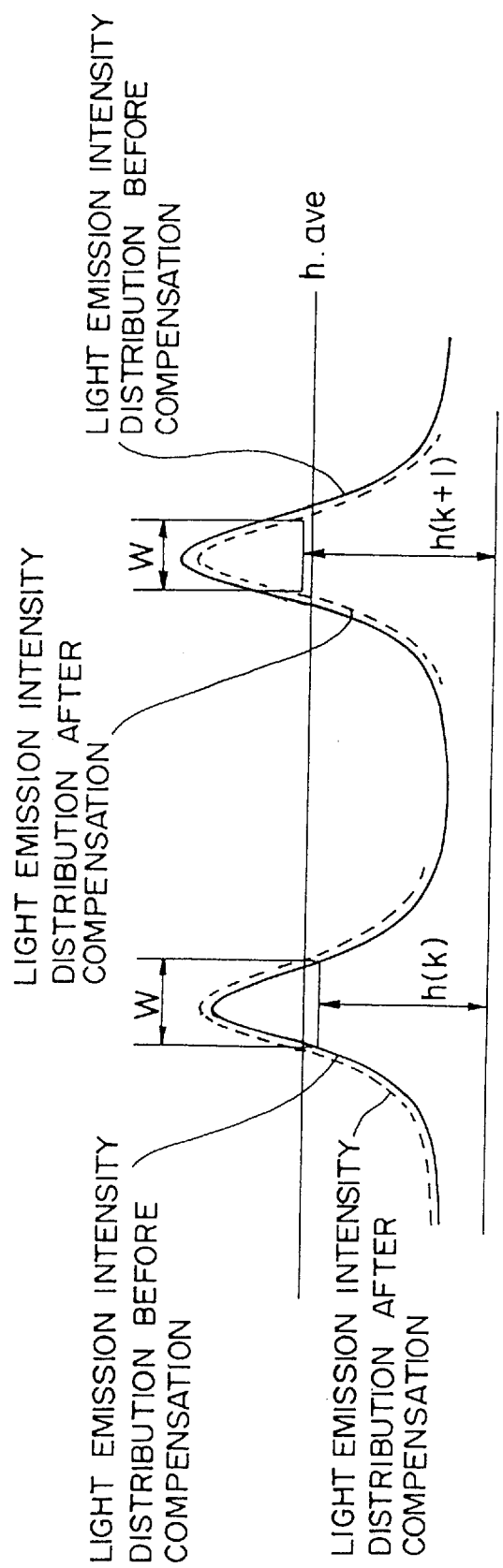

LIGHT EMISSION INTENSITY WIDTH COMPENSATING METHOD OF LED PRINT HEAD AND APPARATUS THEREOF

BACKGROUND OF THE INVENTION

1. Field of the Invention

The present invention relates to a light emission intensity width compensating method of a LED print head for use with an electrophotographic printing apparatus and an apparatus thereof.

2. Description of the Related Art

In an electrophotographic printing apparatus, the surface of an image drum that is equally charged by a charging unit is exposed and then an electrostatic latent image is formed. The electrostatic latent image is developed and then a toner image is formed. The toner image is transferred on a print medium and then fixed thereon.

In the electrophotographic printing apparatus, an optical print head is used in an exposing portion. The exposing portion exposes the surface of the image drum that is equally charged. As an example of the optical print head, a LED print head that has LED devices (light emitting diode devices) has been widely used because of high speed operation and small construction.

The LED print head is constructed of a large number of LED devices, driver circuits that drive and cause corresponding LED devices to emit light, and a SELFOC LENS (trade mark of NIPPON SHEET GLASS CO., LTD.) that focuses the light emitted from the LED devices on the surface of the image drum that is equally charged. (Hereinafter, the SELFOC LENS is simply termed a lens.)

However, in the LED print head, the positions of optical systems between each of LED devices and the lens deviate and the shapes of the LED devices also deviate. Thus, even if constant drive energy is applied to each of the LED devices, an electrostatic image is unequally formed on the surface of the image drum due to an unequal exposure. Thus, toner particles are not equally transferred to a print medium. Consequently, the printing density deviates.

SUMMARY OF THE INVENTION

An object of the present invention is to prevent uneven print density of the above-described LED print head and to provide a light emission intensity width compensating method for compensating drive energy of each of LED devices of a LED print head so that a light emission intensity width having a light emission intensity equal to or greater than a reference light emission intensity in a light emission intensity distribution of each of the LED devices becomes equal and an apparatus thereof. To accomplish such an object, according to the present invention, the light emission intensity distribution of each of the LED devices of the LED print head is measured. Corresponding to the distribution, a compensation value of drive energy of each of the LED devices is designated so as to compensate the light emission intensity width.

A first compensating method according to the present invention comprises the steps of designating at least two reference light emission intensities that are reference vales in a measured light emission intensity distribution of LED devices, measuring a light emission intensity width of each of the reference light emission intensities, designating a compensation value of drive energy of each of the LED devices corresponding to each of the light emission intensity widths so as to compensate the light emission intensity widths.

A second measuring method according to the present invention comprises the steps of obtaining a reference light emission intensity for each of LED devices corresponding to a measured light emission intensity distribution of each of LED devices so that a predetermined reference light emission intensity width is obtained, calculating the average value of the reference light emission intensities, designating a compensation value of drive energy of each LED device so that the predetermined reference light emission intensity width is obtained when the light emission intensity distribution of each of the LED devices is slid by the average value of the reference light emission intensity value, and compensating the light emission intensity width.

The compensation values of the designated drive energy are stored in one of a storing means of the LED print head and a storing means of the main unit portion of the electrophotographic printing apparatus.

These and other objects, features and advantages of the present invention will become more apparent in light of the following detailed description of best mode embodiment thereof, as illustrated in the accompanying drawings.

BRIEF DESCRIPTION OF THE DRAWINGS

FIG. 10 is a graph for explaining a compensating method of a second light emission intensity width according to a second embodiment of the present invention.

DETAILED DESCRIPTION OF THE PREFERRED EMBODIMENTS

Next, with reference to the accompanying drawings, embodiments of the present invention will be described.

Figure 1:
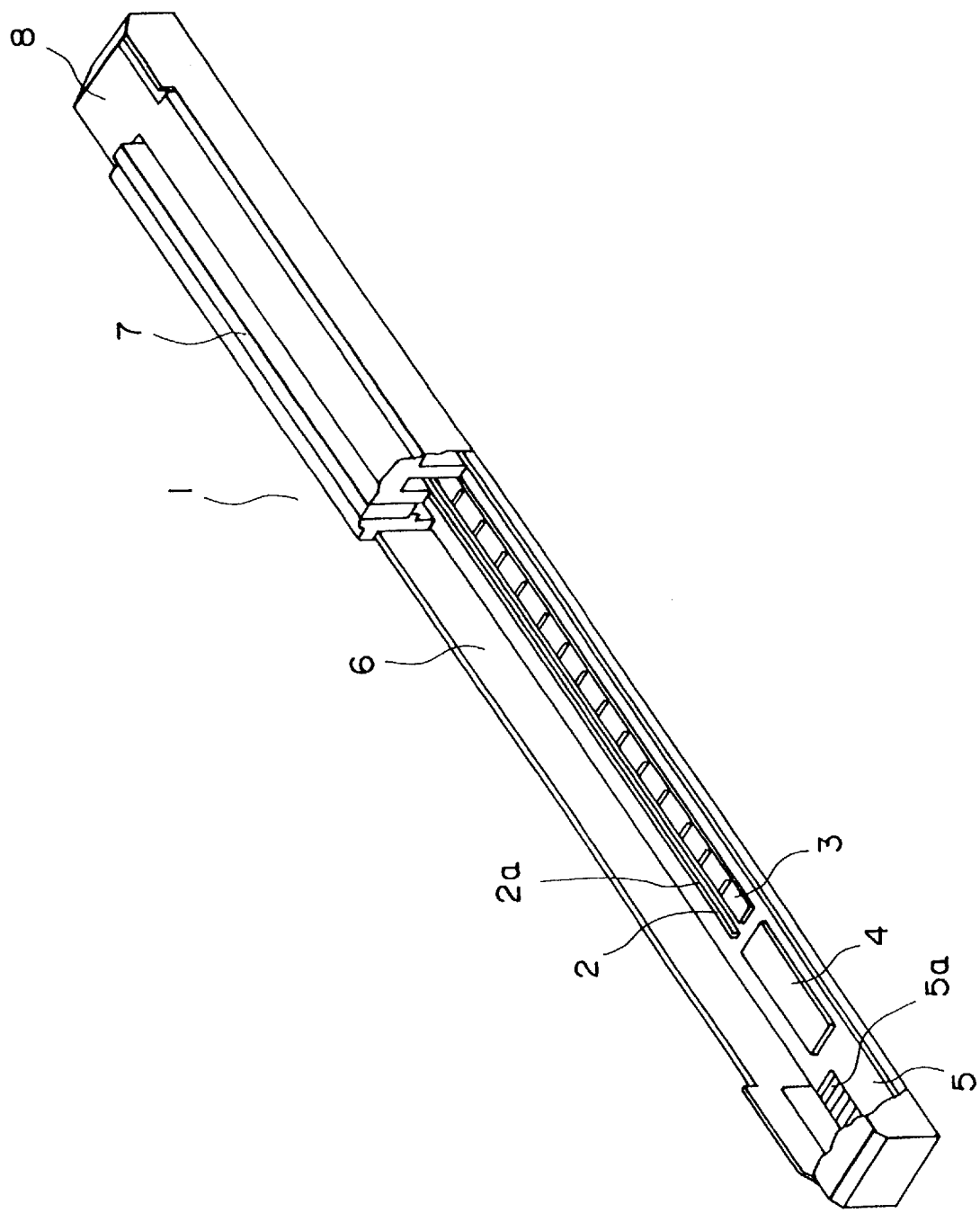
FIG. 1 is a perspective view showing the construction of an LED print head according to the present invention.

FIG. 1 is a perspective view showing the construction of an LED print head according to the present invention.

In FIG. 1, the LED print head is denoted by reference numeral 1 and constructed of LED chips 2, driver circuits 3, a board 5, a frame 6, a lens 7, and a housing 8. The LED chips 2 are LED devices that are light emitting diode devices. The board 5 has a non-volatile storing means 4 that stores a compensation value of drive energy of each of the LED devices. The compensation value is sent to the corresponding driver circuit 3. The frame 6 supports the board 5.

On the board 5, the LED chips 2 are disposed at predetermined pitches so that the light emitting surfaces 2a and electrode surfaces thereof face outside and inside, respectively. The board 5 also has a connection portion 5a that connects signal lines to a print control unit 9 (see FIG. 2) of the main unit portion of the printing apparatus.

The housing 8 holds the board 5 and the lens 7 so that the distance between the light emitting surfaces 2a of the LED chips 2 and the lens 7 is kept constant.

Figure 2:
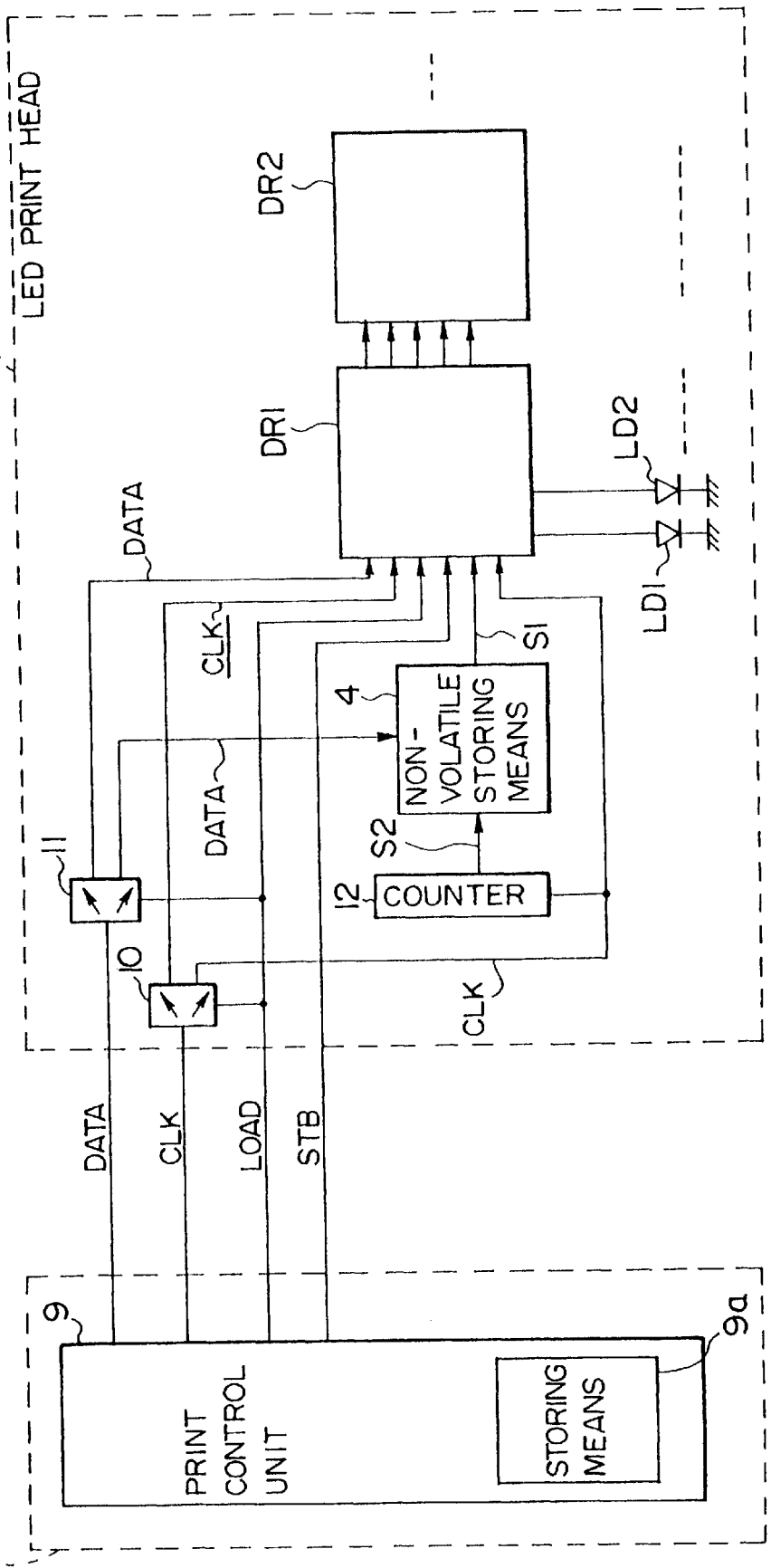
FIG. 2 is a block diagram showing the LED print head and a main unit portion of an electrophotographic printing apparatus according to the present invention.

Next, with reference to FIG. 2, the operation of the LED print head 1 according to the present invention will be described. FIG. 2 is a block diagram showing the LED print head and the main unit portion of the electrophotographic printing apparatus according to the present invention.

In FIG. 2, the LED print head 1 is controlled corresponding to signals DATA, CLK, LOAD, and STB that are sent from the print control unit 9 of the main unit portion of the electrophotographic printing apparatus.

The signal DATA is a real print data signal that is sent from the print control unit 9 of the main unit portion of the electrophotographic printing apparatus. The signal CLK is a clock signal for generating timings of individual operations. The signal LOAD is a data latch signal. The signal STB is a print drive signal for driving the driver.

The real print data signal DATA and the clock signal CLK are input from the print control unit 9 of the main unit portion of the electrophotographic printing apparatus to the LED print head 1.

The input real print data signal DATA is successively sent as data of the LED devices LD1, LD2, . . . and so forth to the driver circuits DR1, DR2, . . . and so forth in synchronization with the clock signal CLK.

When the real print data DATA for one line of the LED devices LD1, LD2, . . . and so forth of the LED print head 1 is input to the driver circuits DR1, DR2, . . . and so forth, the latch signal LOAD is input from the print control unit 9 to the driver circuits DR1, DR2, . . . and so forth. Thus, the real print data DATA is latched.

When the print drive signal STB is input to the driver circuits DR1, DR2, . . . and so forth, the driver circuits DR1, DR2, . . . and so forth that have the real print data DATA with a logic of light emission successively cause the LED devices to emit light. Thus, the surface of the image drum that is equally charged is exposed and thereby an electrostatic image is formed on the surface of the image drum.

The LED Print head 1 of the present invention has a non-volatile storing means 4 that is composed of an EPROM or an EEPROM.

Compensation values of drive energy for the LED devices LD1, LD2, . . . and so forth have been stored in the non-volatile storing means 4.

The compensation values of the drive energy are designated so that a dot image is formed on the surface of the image drum that is equally charged. In other words, the light emission intensity of each LED device is not equally designated.

According to the present invention, a selector 10 for selecting a compensation value of drive energy stored in the non-volatile storing means 4 and for sending it to the driver circuits DR1, DR2, . . . and so forth is provided.

Thus, the selector 11 is used to write the compensation values of the drive energy to the driver circuits. The operation of the selector 11 will be described later.

Next, the sending method of the compensation values of the drive energy will be described.

In this embodiment, when the signal level of the latch signal LOAD that is input to the selector 10 becomes high, the selector position of the selector 10 is changed so that the clock signal CLK is output to a counter 12.

Corresponding to the clock signal CLK, the counter 12 outputs an address signal S2 to the non-volatile storing means 4. The address signal S2 represents the address of the non-volatile storing means 4.

The non-volatile storing means 4 stores the compensation values of the drive energy for the LED devices LD1, LD2, . . . and so forth. When the non-volatile storing means 4 receives the address signal S3, the non-volatile storing means 4 outputs the compensation values of the drive energy as a drive energy compensation value commanding signal S1 and successively sends the signal S1 to the driver circuits DR1, DR2, . . . and so forth.

The driver circuit DR1, DR2, . . . and so forth cause the LED devices LD1, LD2, . . . and so forth to emit light corresponding to the compensation values of the drive energy. Corresponding to the light emission of the LED devices LD1, LD2, . . . and so forth, the surface of the image drum that is equally charged is exposed and thereby an electrostatic image with an equal dot diameter is formed.

Before the print operation is started with the real print signal DATA, the compensation values of the drive energy stored in the non-volatile storing means 4 are sent as the drive energy compensation value commanding signal S1 to the driver circuits DR1, DR2, . . . and so forth.

After the power of the printing apparatus is turned on, when the drive energy compensation value commanding signal S1 is sent to the driver circuits DR1, DR2, . . . and so forth, the signal S1 can be prevented from interfering with the real print data signal DATA.

Next, a measuring method of the light emission intensity of each LED device and a designating method of a compensation value of drive energy will be described.

Figure 3:
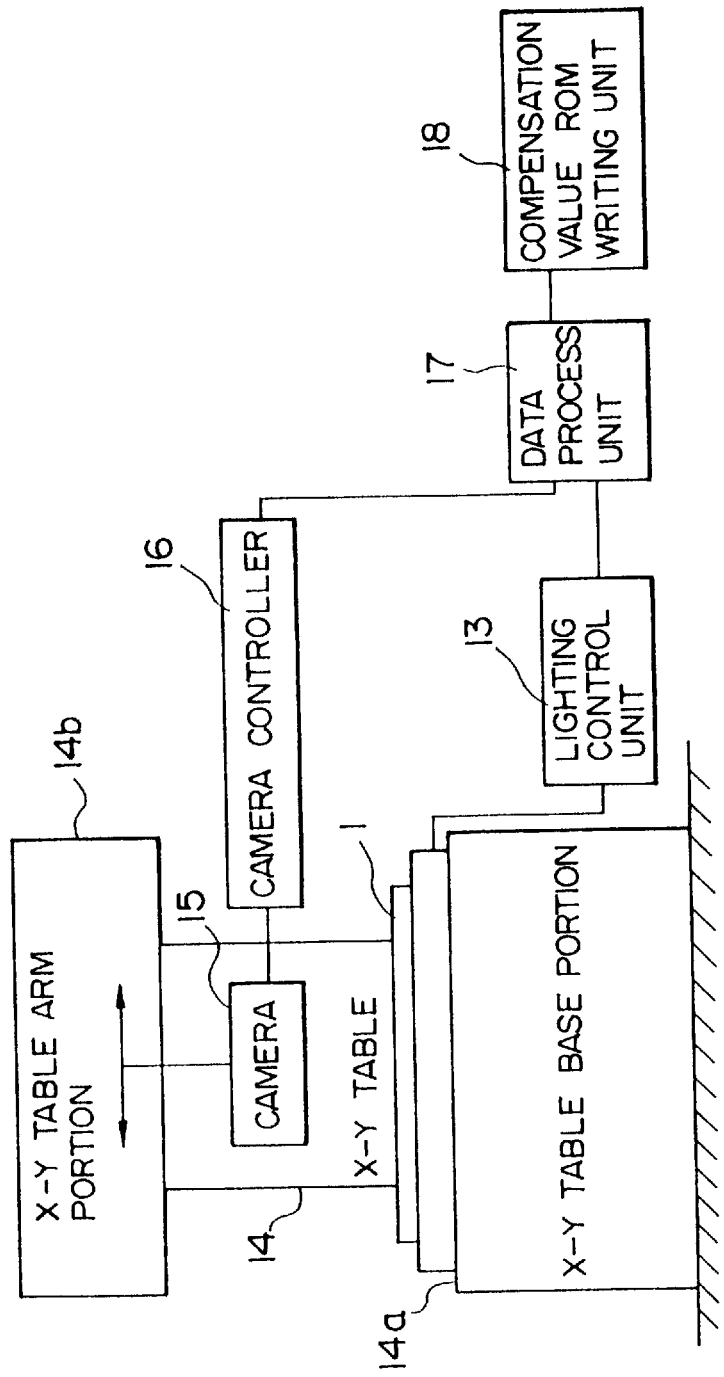
FIG. 3 is a block diagram showing a unit that measures the entire light emission intensity of each light emitting portion and designates a compensation value of drive energy according to an embodiment of the present invention.

FIG. 3 is a block diagram showing a unit that measures a light emission intensity distribution of the LED devices of the LED print head 1 according to the present invention and designates the compensation values of the drive energy for compensating the light emission intensities for the LED devices.

In FIG. 3, the light emission intensities of the LED devices of the LED print head 1 are measured by a lighting control unit 13, an X-Y table 14, a camera 15, and a camera controller 16. The lighting control unit 13 is connected to the LED print head 1. The lighting control unit 13 selects a LED device to be lit. The X-Y table 14 is constructed of a base portion 14a and an arm portion 14b. On the base portion 14a, the LED print head 1 is disposed. The arm portion 14b moves in X and Y directions. The camera 15 is disposed on the arm portion 14 of the X-Y table 14. The camera 15 is moved to a predetermined position by the arm portion 14b of the X-Y table 14 so as to measure the light emission intensities of the LED devices of the LED print head 1. The camera controller 16 measures the light emission intensity distribution from an image photographed by the camera 15, processes the light emission intensify of the image, and converts the light emission intensity into a digital signal.

The compensation values of the drive energy are measured by a data process unit 17 and a compensation value ROM writing unit 18. The data process unit 17 inputs and processes the light intensity distribution of each LED device. The compensation value ROM writing unit 18 writes the processed data to a storing means.

Next, a measuring method using the above-described unit will be described.

In FIG. 3, the LED print head 1 is connected to the lighting control unit 13. In this condition, the LED print head 1 is secured to the base portion 14a of the X-Y table 4.

The compensation values of the drive energy of the LED devices of the LED print head 1 have been determined.

The lighting control unit 13 selects an LED device of the LED print 1 to be lit and outputs information of the LED device that is lit to the data process unit 17.

The X-Y table 14 is moved to the position where the camera 15 on the arm portion 14b on the X-Y table 14 can photograph the entire light emitting portion of the LED device that is lit.

The camera 15 that is moved to the position photographs an image of the light emitting portion of the LED device that is lit.

Figure 4:
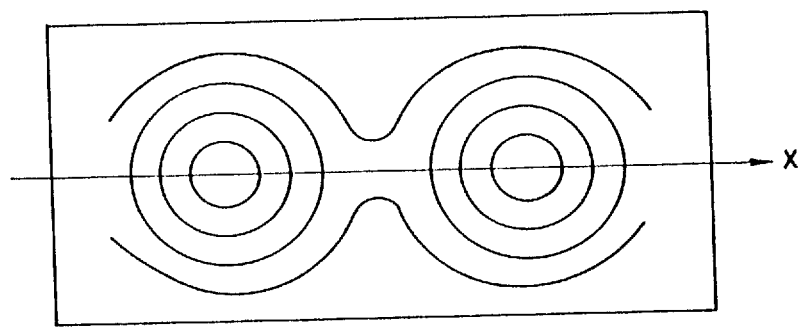
FIG. 4 is a schematic diagram showing an image photographed by a camera in the case that a light emitting portion according to the embodiment of the present invention is lit.

FIG. 4 is a schematic diagram showing an image of a lighting LED device photographed by the camera 15.

The lines shown in FIG. 4 are contour lines that represent light emission intensities. The outermost contour line represents the highest light emission intensity, whereas the innermost contour line represents the lowest light emission intensity.

In FIG. 4, two LED devices are lit at the same time. It should be noted that the number of LED devices to be lit is not limited to two as long as the camera 15 can photograph the entire light emitting portion.

The image of the LED device photographed by the camera 15 is output to the camera controller 16. The camera controller 16 digitizes the image into digital data.

Figure 5:
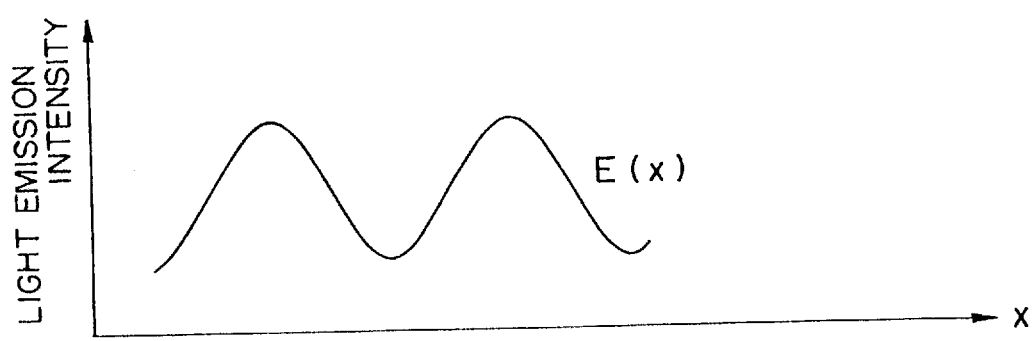
FIG. 5 is a graph showing a light emission intensity distribution of FIG. 4.

When the image of the LED device photographed by the camera 15 is sliced corresponding to the X axis of FIG. 4, the image of the LED device can be represented as a light emission intensity distribution curve shown in FIG. 5.

FIG. 5 is a graph showing the relation between X (vertical axis) and light emission intensity (horizontal axis).

The camera controller 16 outputs the light emission intensity distribution of the LED device that is lit to the data process unit 17.

The above-described measuring operation is performed for all the LED devices of the LED print head 1.

The measured results of all the LED devices of the LED print head 1 are input to the data process unit 17.

Figure 6:
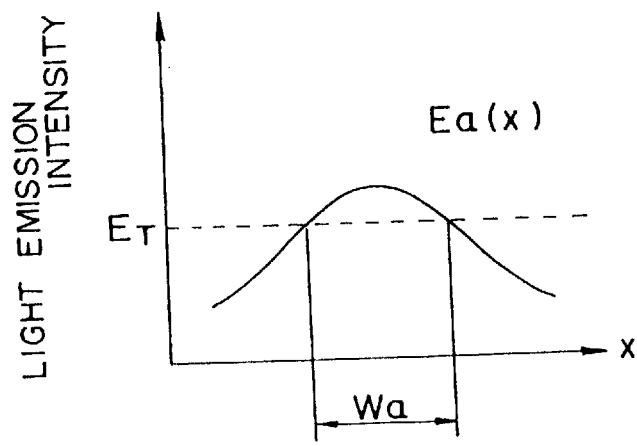
FIG. 6 is a graph showing a first light emission intensity distribution of a LED device that has a large variance on the surface of a image drum.
Figure 7:
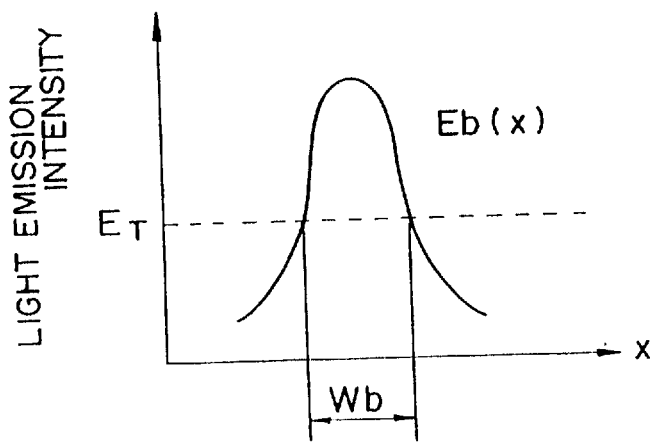
FIG. 7 is a graph showing a second light emission intensity distribution of a LED device that has a small variance on the surface of the image drum.

FIGS. 6 and 7 are graphs showing respective light emission intensity distributions of two LED devices of the LED print head 1 obtained by the above-described measuring method. In these graphs, horizontal axis and vertical axis represent X and light emission density, respectively. These differences result from a deviation of optical systems between LED devices and lens and a deviation of shapes of the LED devices.

In FIGS. 6 and 7, when the image drum of the electrophotographic printing apparatus with the LED print head 1 has a sensitivity of which toner particles are adhered to the surface at a light emission intensity of $E_T$ or greater, the LED devices with light emission intensity distributions $E_a(x)$ and $E_b(x)$ have light emission intensity widths $W_a$ and $W_b$, respectively because of the difference of the light emission intensity distributions.

In other words, since toner particles are adhered to the light emission intensity widths on the surface of the image drum, when the light emission intensity widths differ each other, the amount of adhered toner particles differ, resulting in an uneven density.

When the drive energy of LED devices that have different light emission intensity distributions is slightly compensated, the light emission intensity width of the first LED device that has the light emission intensity distribution $E_a(x)$ as shown in FIG. 6 is largely compensated. Thus, the amount of adhered toner particles is largely compensated. On the other hand, in this case, even if the drive energy is largely compensated, the light emission intensity width of the second LED device that has the light emission intensity distribution $E_b(x)$ as shown in FIG. 7 is hardly compensated. Thus, the amount of adhered toner particles is not compensated.

Thus, according to the present invention, the difference of the light emission intensity distributions is determined and compensation values of drive energy is designated. Next, with reference to FIG. 8, such a method will be described.

Figure 8:
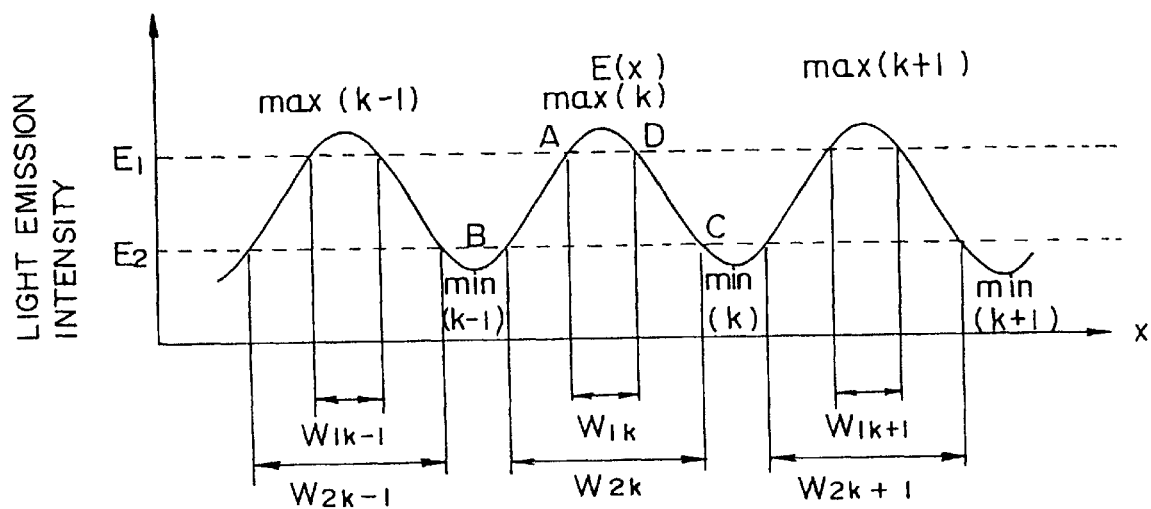
FIG. 8 is a graph showing a method for determining the difference of light emission intensity distributions according to a first embodiment of the present invention.

FIG. 8 is a graph for explaining a method for determining the difference of the light emission intensity distributions according to a first embodiment of the present invention.

The determination of the difference of light emission intensity distributions and the designation of compensation values of the drive energy are performed by the data process unit 17 (see FIG. 3).

In FIG. 8, the minimum value min(max) of maximal values max(i) (where i=1, 2, . . . and so forth, k, k+1, . . . and so forth) of the light emission intensity distributions of the LED devices is obtained. In addition, the maximum value max(min) of minimal values min(i) (where i=1, 2, . . . and so forth, k, k+1, . . . and so forth) of the light emission intensity distributions of the LED devices is obtained.

The range between the minimum value min(max) and the maximum value max(min) is designated as a reference light emission intensity designating range. In this range, two reference light emission intensities that are a large reference light emission intensity E1 and a small reference light emission intensity E2 are designated.

In this embodiment, as shown in FIG. 8, it is assumed that the large reference light emission intensity E1 is 0.9x min(max) and the small reference light emission intensity E2 is 1.1x max(min).

Next, a light emission intensity width W2i satisfies the condition E(x)>E2 and a light emission intensity width w1i that satisfies the condition E(x)>E1 are calculated.

When the difference between W2i and w1i is large, it is clear that the variance of the light emission intensity distribution is large. When the difference between W2i and wli is small, it is clear that the variance of the light emission intensity distribution is small.

Thus, according to the present invention, when the difference between the light emission intensity widths W2i and w1i is small, since the variance of the light emission intensity distribution E(x) is small, the drive energy is largely compensated. On the other hand, when the difference between the light emission intensity widths W2i and w1i is large, since the variance of the light emission intensity distribution E(X) is large, the drive energy is slightly compensated.

When there are two LED devices with a large light emission intensity distribution and a small light emission intensity distribution, the drive energy of the LED device with the large light emission intensity distribution that can be easily compensated is compensated.

In other words, when the first LED device has the large light emission intensity distribution $E_a(x)$ as shown in FIG. 6 and the second LED device has the small light emission intensity distribution $E_b(x)$ as shown in FIG. 7, the drive energy of the first LED device is varied.

The drive current is varied or the drive time period for driving the LED devices is varied so that the light emission intensity width Wb of the second LED device shown in FIG. 7 becomes equal to the light emission intensity width Waa of which the light emission intensity width Wa of the first LED device shown in FIG. 6 has been compensated.

Figure 9:
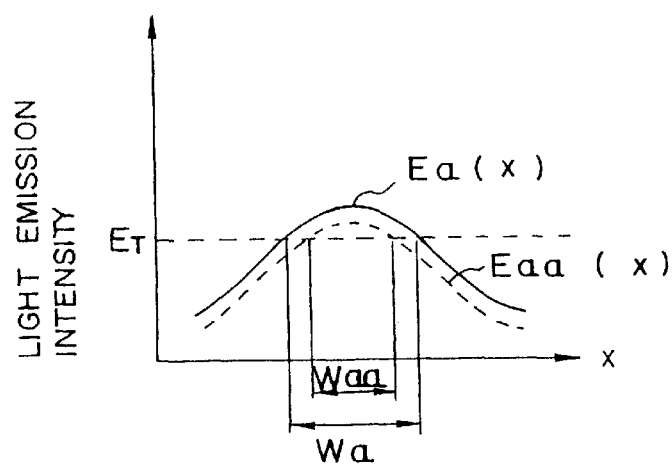
FIG. 9 is a graph for explaining a compensating method of a light emission intensity width according to the first embodiment of the present invention.

FIG. 9 is a graph showing that the light emission intensity distribution $E_a(x)$ (represented by a solid line) of the first LED device has been compensated to the light emission intensity distribution $E_{aa}(x)$ (represented by a dashed line) and that the light emission intensity width $W_{aa}$ matches the light emission intensity width $W_b$ of the second LED device.

The resultant compensation values of the drive energy are written from the compensation value ROM writing unit 18 (see FIG. 3) to the non-volatile storing means 4 (see FIG. 2) of the LED print head 1.

Before the write operation is performed, the compensation value ROM writing unit 18 (see FIG. 18) should have been connected to the LED print head 1.

The compensation value ROM writing unit 18 (see FIG. 3) has a latch signal output terminal, a compensation data output terminal, and a clock signal output terminal. The latch signal output terminal outputs the latch signal LOAD. The compensation data output terminal outputs the compensation values of the drive energy. The clock signal output terminal outputs the clock signal CLK.

On the other hand, the compensation value ROM writing unit 18 (see FIG. 3) of the LED print head 1 has a real print data signal DATA input terminal, a latch signal LOAD input terminal, and a clock signal CLK input terminal.

Thereafter, the output terminals of the compensation value ROM writing unit 18 are connected to the corresponding input terminals of the LED print head 1 that have been disconnected from the main unit portion of the electrophotographic printing apparatus in the following manner. The compensation data output terminal of the compensation value ROM writing unit 18 is connected to the real print data signal DATA input terminal of the LED print head 1. The latch signal output terminal of the compensation value ROM writing unit 20 is connected to the latch signal LOAD input terminal of the LED print head 1. The clock signal output terminal of the compensation value ROM writing unit 20 is connected to the clock signal CLK input terminal of the LED print head 1.

In this state, the compensation values of the drive energy of the LED devices are input to the non-volatile storing means 4 of the LED print head 1. Next, this method will be described.

In FIG. 2, when the signal level of the latch signal LOAD that is output from the compensation value ROM writing unit 18 (see FIG. 18) to the selector 11 becomes high, the selector position of the selector 11 is changed so that the compensation value data signal DATA is output from the compensation value ROM writing unit 18 (see FIG. 3) to the non-volatile storing means 4.

Likewise, when the signal level of the latch signal LOAD that is output from the compensation value ROM writing unit 18 (see FIG. 3) becomes high, the selector position is changed so that the clock signal CLK is output from the compensation value ROM writing unit 18 (see FIG. 3) to the counter 12. Corresponding to the input of the clock signal CLK, the counter 12 outputs the address signal S2 that represents the address of the non-volatile storing means 4 to the non-volatile storing means 4. Corresponding to the address, the compensation values of the drive energy of the LED devices LD1, LD2, . . . and so forth are stored in the nonvolatile storing means 4.

It should be noted that the compensation values of the LED devices can be stored in the storing means 9a of the print control unit 9 of the main unit portion of the electrophotographic printing apparatus so as to designate the drive energy corresponding to a STB signal of the print drive signal.

Next, a second embodiment of the second embodiment will be described.

The construction of the second embodiment is the same as that of the first embodiment except for the compensation value designating method of the drive energy. Since the construction of the LED print head and the measuring method of the light emission intensity are the same as those of the first embodiment, only the compensation value designating method of the drive energy will be described.

FIG. 10 is a graph for explaining the compensation value designating method of the second drive energy corresponding to the second embodiment of the present invention.

Next, with reference to FIG. 10, the compensation value designating method of the second drive energy will be described.

The light emission intensity distribution of each LED device of the LED print head 1 that has been obtained in the same measuring method as the first embodiment is input to the data process unit 17.

The data process unit 17 calculates a reference light emission intensity h(i) that is a light emission intensity for each LED device so as to obtain a predetermined reference light emission intensity width W of a light emission intensity distribution of each LED device of the LED print head 1.

The reference light emission intensity h(i) (where i=1, 2, . . . and so forth, k, k+1, . . . and so forth) is calculated for each LED device.

Thereafter, the average value have of the reference light emission intensity h(i) is calculated.

With the average value h_ave that is a target value of each LED device, a compensation value Hosei(i) of the drive energy of the LED device is designated as follows.

Hosei(i)=h_ave/h(i)

Corresponding to the compensation value, the reference light emission intensity h_after(i) of the LED device is expressed as follows.

h_after(i)=h(i)×Hosei(i)=h(i)×h_ave/h(i)=h_ave

Thus, the reference light emission intensity of each LED device becomes the same and the light emission intensity width of each LED device has the same value W.

In other words, according to the second embodiment, the drive energy is compensated corresponding to the average value h_ave of the reference light emission intensity so that the light emission intensity width of each LED device becomes the predetermined light emission intensity width W. Since toner particles are adhered to the predetermined light emission intensity width W, the toner particles are adhered to the same area for each LED device on the image drum and thereby an equal image can be obtained.

The compensation values are sent to the compensation value ROM writing unit.

As with the first embodiment, the writing unit 18 writes the compensation values to the non-volatile storing means 4

(see FIG. 2) of the LED print head 1 and the storing means 9a (see FIG. 2) of the print control unit 9 of the main unit portion of the electrophotographic printing apparatus.

According to the compensation value designating method of the drive energy of the second embodiment, since the reference light emission intensity is compensated to the predetermined light emission intensity width, each LED can be accurately compensated.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A light emission intensity compensating method of an optical print head having a large number of light emitting devices, comprising the steps of:

(a) measuring a light emission intensity distribution of each of the light emitting devices of the optical print head;

(b) slicing the light emission intensity distribution corresponding to a reference light emission intensity and calculating a light emission intensity width of the reference light emission intensity; and (c) designating a compensation value of drive energy of each of the light emitting devices so that each light emission intensity width becomes a constant value.

2. The light emission intensity compensating method as set forth in claim 1, wherein the compensation value of the drive energy is designated corresponding to the value of a drive current.

3. The light emission intensity compensating method as set forth in claim 1, wherein the compensation value of the drive energy is designated corresponding to a period of drive time.

4. An electrophotographic recording apparatus having an optical print head with a large number of light emitting devices, the optical print head including storing means for measuring a light emission intensity distribution of the optical print head, slicing the light emission intensity distribution corresponding to a reference light emission intensity, designating a compensation value of drive energy of each of the light emitting devices so that the light emission intensity width of each reference light emission intensity becomes a constant value, and storing the compensation value of the drive energy.

5. The electrophotographic recording apparatus as set forth in claim 4, wherein the storing means is disposed in a print control unit of said electrophotographic recording apparatus.

6. A light emission intensity compensating method of an optical print head having a large number of light emitting devices, comprising the steps of:

(a) measuring a light emission intensity distribution of each of the light emitting devices of the optical print head;

(b) slicing the light emission intensity distribution corresponding to at least two reference light emission intensities and calculating light emission intensity widths corresponding to the reference light emission intensities; and (c) designating a compensation value of drive energy of each of the light emitting devices corresponding to each of the light emission intensity widths.

7. The light emission intensity compensating method as set forth in claim 6, wherein the reference light emission intensities are smaller than the minimum value of maximal values of the light emission intensities of the light emitting devices and greater than the maximum value of minimal values thereof.

8. The light emission intensity compensating method as set forth in claim 6, wherein the compensation value of the drive energy is increased when the difference between the light emission intensity widths sliced corresponding to the reference light emission intensities is small, and wherein the compensation value of the drive energy is decreased when the difference between the light emission intensity widths sliced corresponding to the reference light emission intensities is large.

9. The light emission intensity compensating method as set forth in claim 6, wherein the compensation value of the drive energy is designated corresponding to the value of a drive current.

10. The light emission intensity compensating method as set forth in claim 6, wherein the compensation value of the drive energy is designated corresponding to a period of drive time.

11. An electrophotographic recording apparatus having an optical print head with a large number of light emitting devices, the optical print head including storing means for measuring a light emission intensity distribution of the optical print head, slicing the light emission intensity distribution corresponding to at least two reference light emission intensities, calculating a light emission intensity width for each of the reference light emission intensities, designating a compensation value of drive energy of each of the light emitting devices corresponding to each light emission intensity width, and storing the compensation value of the drive energy.

12. The electrophotographic recording apparatus as set forth in claim 11, wherein said storing means is disposed in a print control unit of said electrophotographic recording apparatus.

13. A light emission intensity compensating method of an optical print head with a large number of light emitting devices, comprising the steps of:

(a) measuring a light emission intensity distribution of the optical print head;

(b) calculating a reference light emission intensity that is a light emission intensity of each of the light emitting devices so as to obtain a reference light emission intensity width of the light emission intensify distribution;

(c) calculating the average value of the reference light emission intensities; and (d) designating a compensation value of drive energy so that the light emission intensity of each of the light emitting devices becomes the average value of the reference light emission intensities.

14. The light emission intensity compensating method as set forth in claim 13, wherein the compensation value of the drive energy is designated corresponding to the value of a drive current.

15. The light emission intensity compensating method as set forth in claim 13, wherein the compensation value of the drive energy is designated corresponding to a period of drive time.

16. An electrophotographic recording apparatus having an optical print head with a large number of light emitting devices, the optical print head including storing means for measuring a light emission intensity distribution of the optical print head, calculating a light emission intensity of each of the light emitting devices so as to obtain a reference light emission intensity width of the light emission intensity distribution, designating a compensation value of drive energy of each of the light emitting devices corresponding to each of the light emission intensity widths, and storing a compensation value of the drive energy.

17. The electrophotographic recording apparatus as set forth in claim 16, wherein said storing means is disposed in a print control unit of said electrophotographic recording apparatus.

* * * * *